United States Patent [19]

Kayser

[11] Patent Number: 4,638,178
[45] Date of Patent: Jan. 20, 1987

[54] MODULAR POWER SYSTEM

[75] Inventor: Dennis J. Kayser, Hudson, N.H.

[73] Assignee: Wang Laboratories, Inc., Lowell, Mass.

[21] Appl. No.: 771,872

[22] Filed: Sep. 3, 1985

[51] Int. Cl.[4] .............................................. H02J 1/00
[52] U.S. Cl. ...................................... 307/85; 307/66; 307/149; 307/150; 307/151
[58] Field of Search ............... 307/149, 150, 151, 112, 307/125, 85; 323/273, 282, 283

[56] References Cited

U.S. PATENT DOCUMENTS 3,717,805  2/1973  Gnaedinger et al. ............ 307/151 X
3,721,890  3/1973  Ettinger et al. ................. 307/151 X

OTHER PUBLICATIONS

G. Eccher, Multiplex Equipment Power Supply, Nov. 1975, pp. 67-72.

Primary Examiner—William M. Shoop, Jr.
Assistant Examiner—Alfred F. Hoyte, Jr.
Attorney, Agent, or Firm—Michael H. Shanahan; Gregory P. Gadson

[57] ABSTRACT

A modular power system for use with a digital computer is disclosed. The following major components of the power system are mounted in a convenient removable module, with at least one module for each required power output level: a pass transistor, a power transformer, a rectifier/filter, and a feedback circuit which controls the pulse width of the pass transistor. The modules contain air channels surrounding the pass transistor, for introducing cooling air via an air duct (manifold), so that the pass transistor is efficiently cooled. The need for potentiometers is abrogated by using a precision voltage reference in the feedback circuit to derive output voltages. The modules can also be used in a battery backed-up power system, in which a power system controller monitors and controls the inputs and outputs of the modules and other major components in the system in the case of line power failure. In the preferred embodiment each output voltage level for each module has associated with it a separate group of the following: pass transistor, power transformer, rectifier/filter and feedback circuit. The modules and the power system controller are slidably mounted in a card cage.

10 Claims, 9 Drawing Figures

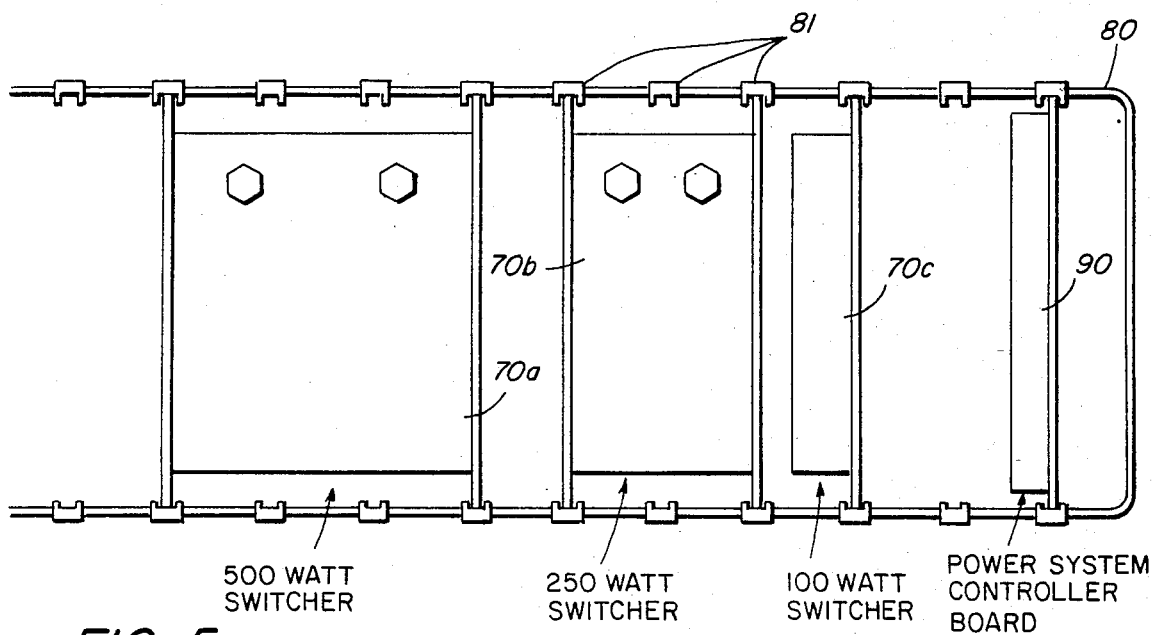
FIG. 5
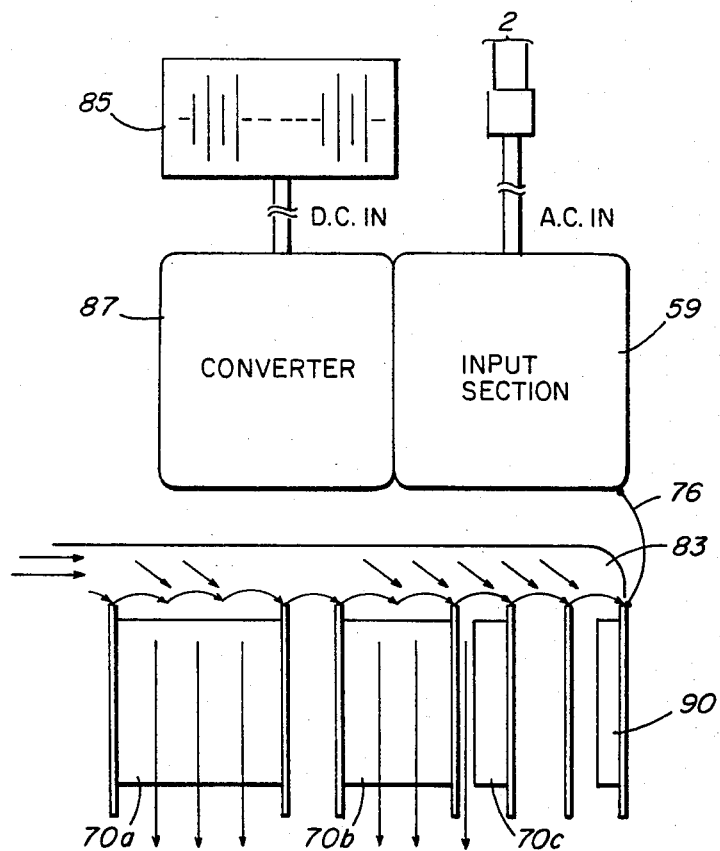
FIG. 6    POWER MODULES – APPROXIMATE LAYOUT (TOP VIEW) IN SYSTEM

MODULAR POWER SYSTEM

BACKGROUND OF THE INVENTION

This invention relates generally to power supplies. More specifically, the present invention relates to switching power supplies used in or with computer systems. Also, the present invention relates to switching power supplies used in conjunction with battery backup systems for operation during the failure of power being supplied to a computer system.

Computers as well as many other digital electronic devices require high quality electric power for their proper operation. For these devices ordinary line power (i.e., power from wall sockets found in many homes and buildings) contains constant voltage fluctuations which are intolerable.

Therefore it is necessary to upgrade the quality of the line power. This is accomplished by rectification, filtering and regulation. Rectification changes the input (line) voltage from an alternating one (AC) to a pulsating direct current (DC) voltage. Filtering converts the pulsating DC voltage to a smooth DC voltage. Finally, regulation steadies the output voltage connected to the load at the desired level.

Many computer systems contain power supplies for delivering multiple voltage outputs which are manufactured separately from the system as a whole. Changing the power supply characteristics of such a system often involves replacement of the entire power supply, is complicated and is often time-consuming.

Additionally, prior art power supplies often contain potentiometers to set output voltages. While this is a feasible approach, there are many problems associated therewith. First, potentiometers are generally one of the least reliable components associated with power systems, often falling into disrepair. Second, because potentiometers are usually manually adjusted, human errors can contribute to improper operation of the system. Finally, the adjusting mechanisms (e.g., knobs) must be made accessible, which can sometimes complicate the package design.

Finally, prior art power supplies for computer systems are generally inefficiently cooled.

SUMMARY OF THE INVENTION

Accordingly, it is a principal object of this invention to devise a power supply wherein a fundamental change in output (load) voltage is easily facilitated without replacing the entire power supply.

Another object of this invention is to provide for feasible upgrading of the power requirements of a computer system when improvements of the computer system result in new power requirements.

Yet another object of this invention is to provide a fungible power supply which is easily transferable between similar computer systems without tedious rewiring, connecting and adjustments.

Still another object of this invention is to eliminate from the power supply potentiometers normally associated therewith.

An additional object of this invention is to provide a power supply with more efficient cooling of those components which dissipate heat above acceptable operating levels.

The foregoing and other objects of the present invention are realized by fabricating substantial portions of a switching power supply on modules. Such modules are insertable in and removable from a power system card cage, which contains the remaining elements of the system power supply. Each module contains some of its components on removable submodules. The modules and the module cage are constructed to provide for efficient cooling when subjecting the modules to heat-transferring airflow over the components of the modules needing cooling via a channeled air duct.

DESCRIPTION OF THE DRAWINGS

The foregoing and other objects and features of the present invention are apparent from the specification, the drawings and the two taken together. The drawings are:

FIG. 5 is a representation of the module cage with the various modules in place.

FIG. 6 is a diagram of a modular switching power system.

DETAILED DESCRIPTION

Figure 1:
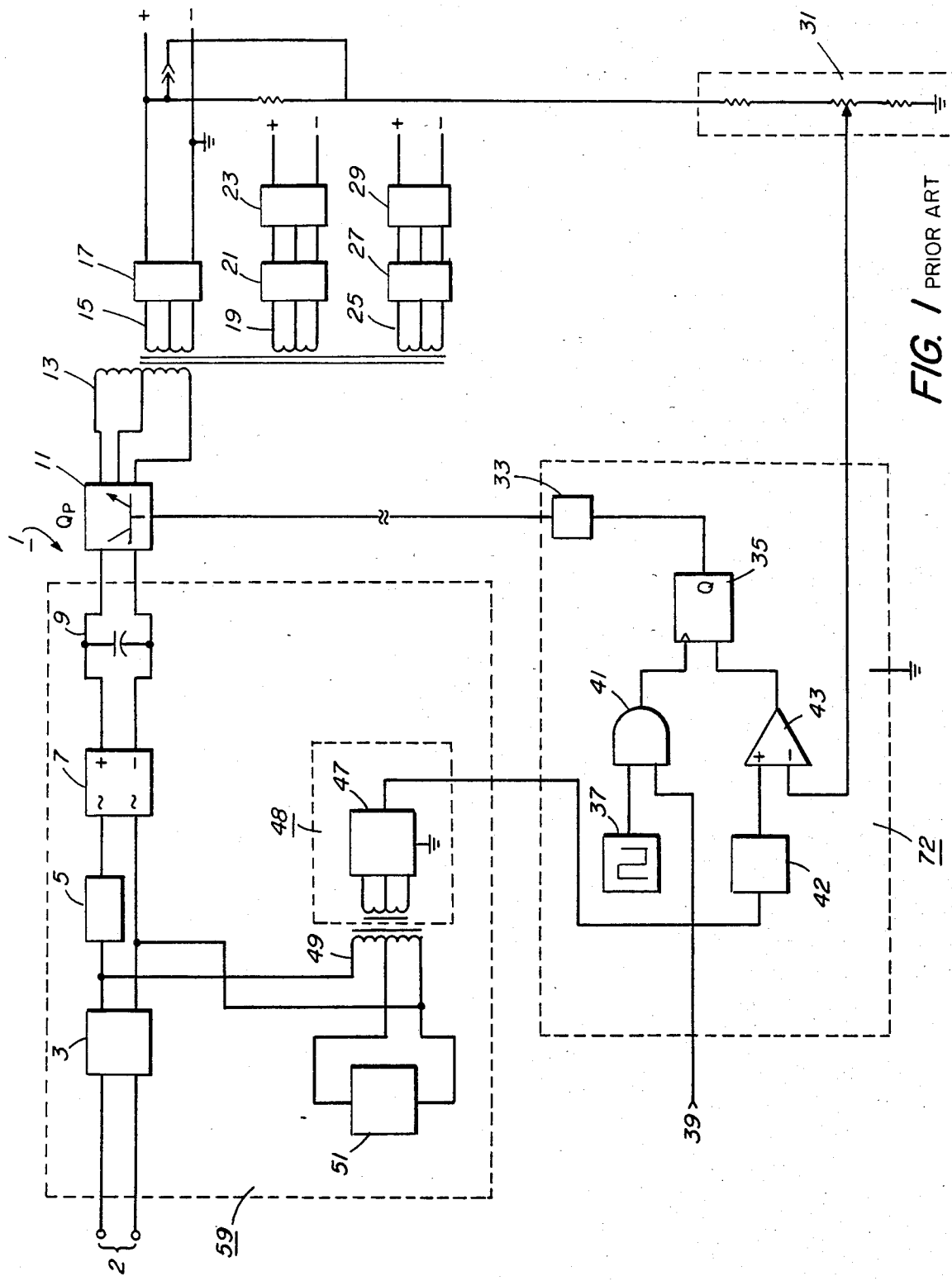
FIG. 1 is a schematic diagram of a typical high powered multi-output switching power supply.

FIG. 1 shows a typical power system used in a digital computer system. The power system (or power supply) 1 transfers the various voltage levels needed to operate the electronic circuitry. A brief description of the input section 59 of the power supply 1 is now presented. AC power from the line power source is filtered by EMI filter 3, a bidirectional device for preventing sharp variations in the line power while shielding the surrounding environment from unacceptable electromagnetic radiation. From there, the current passes through a current limiter 5 which temporarily limits the current being input to rectifier 7 until the energy reservoir 9 (see infra) is charged. The rectifier 7 converts the AC signal being received to a pulsating DC signal. The rectifier 7 is typically a voltage doubler or a bridge rectifier, depending on the magnitude of the line current.

The pulsating DC signal output from the rectifier 7 is applied to an energy reservoir 9, consisting of a least one storage capacitor.

The remainder of power supply 1 is now described. The DC current from the energy reservoir 9 is applied to a pass transistor 11 which acts as a high frequency switch to chop the DC current to effectively convert it to a 20 kilohertz AC source. The switch 11 is controlled by the switching control 72. It basically sets the AC frequency of the output of the transistor 11.

The current from the pass transistor 11 is supplied to a power transformer 13. The input windings of the power transformer are coupled to the secondary windings 15, 19 and 25. The secondary windings deliver power to the outputs for each of the voltages used in the system. Element 17 is a rectifier/filter, and it outputs the primary operating voltage of the system, e.g. 5 volts. A rectifier/filter 21 and a voltage regulator 23 work in combination to produce an additional output voltage. Rectifier/filter 27 and regulator 29 combine to produce yet another output voltage.

The switching control unit 72 controls the switching of pass transistor 11. The pass transistor sends a series of square waves representing the desired frequency of the AC signal applied current to the power transformer 13. The switching is accomplished by varying the ON/OFF operation of the transistor.

The switching control unit 72 contains a pulse width modulator 35, which sends pulse widths to the pass transistor 11. The pulse width is directly proportional to the conducting time of the transistor. Thus a long pulse width results in a long conducting period, whereas a short pulse width results in a short one. The feature enables a high degree of regulation of the output voltage produced from device 17. The pulse width modulator 35 has connected its inputs the following: an error amplifier 43, and a logical AND gate 41 having as inputs an oscillator 37 and an enabler 39.

The oscillator 37 outputs a square wave which serves as a clocked signal to drive the pulse width modulator. The enabler 39 controls the operation and non-operation of the pulse width modulator 35 as follows. When the enabler 39 is in its active state, the pulse width modulator 35 outputs a control pulse. While inactive, enabler 39 halts the operation of the pulse width modulator 35.

The other input of the pulse width modulator 35 is connected to an error amplifier 43 which has one of its inputs connected to the primary voltage output from device 17. The error amplifier compares the actual output voltage of the power supply to a reference input voltage from a zener diode circuit 42. The zener diode circuit 42, which maintains a steady voltage output, is powered by a linear power supply 47. The difference between the two inputs is amplified and sent to the pulse width modulator 35, so that the pulse width varies with power supply output variations in a closed loop feedback system.

The switching control unit 72 is referenced to ground, whereas the pass transistor is not. Therefore, some isolation is needed between the two. Element 33 is an isolation device for isolating the switching control unit 72 from the pass transistor 11. The isolation device 33 may be an optical coupler or a transformer.

The power supply 1 contains a prior art potentiometer 31 for fine tuning of the voltage at the output of rectifier/filter 17. The potentiometer 31 sets the voltage eventually supplied to the load, as well as the input voltage of the error amplifier 43.

The switching control unit 72 has separate power requirements which are met by a linear power supply 48. The linear supply 48 contains a rectifier/filter 47. An autotransformer 49 supplies the necessary power to a fan 51, for cooling the power supply 1 components, inter alia, the pass transistor 11.

Figure 2:
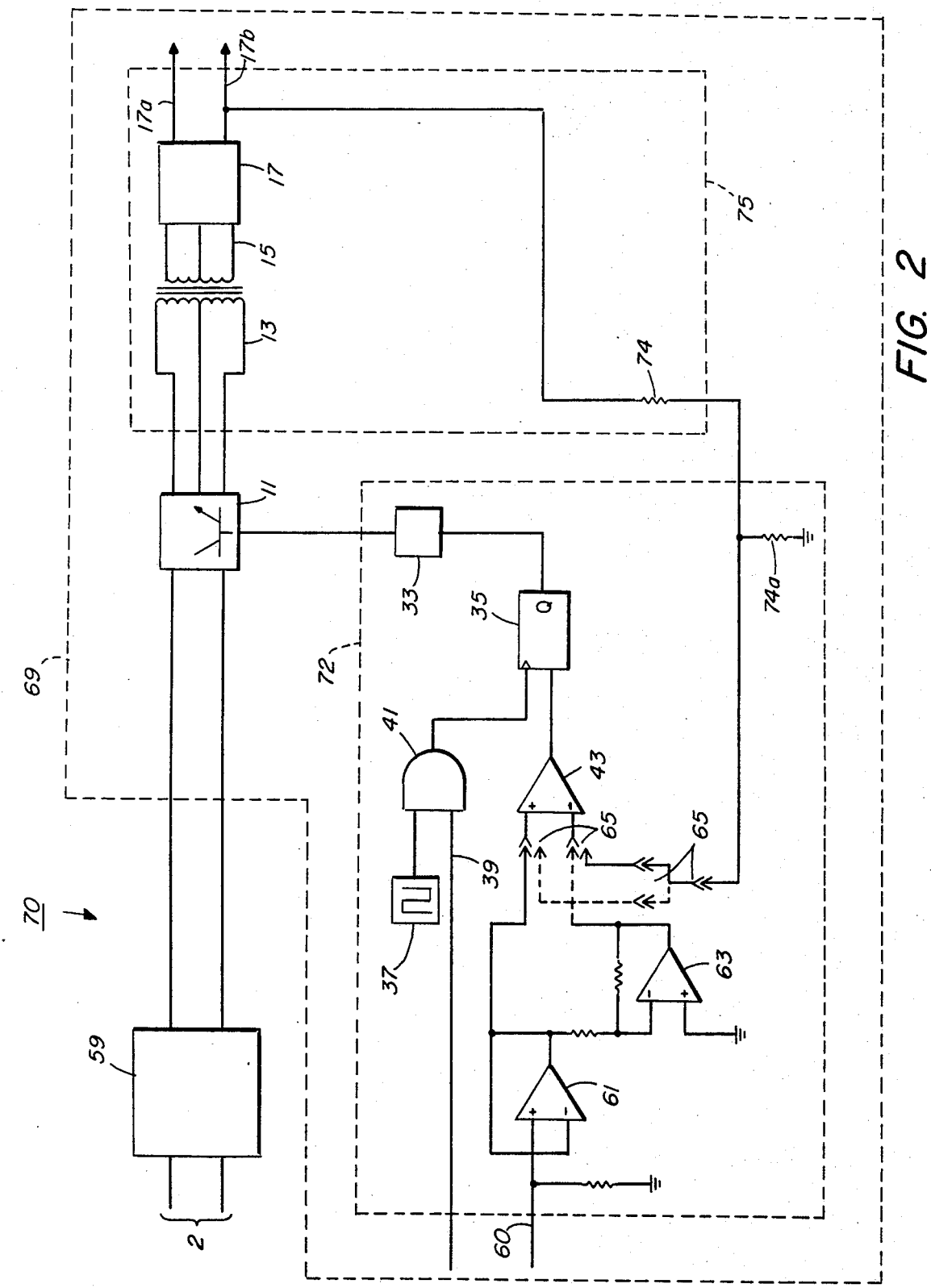
FIG. 2 is an electrical schematic diagram of the power modules of the present invention.

FIG. 2 is an electrical schematic diagram of the switching power supply units 69, which make up the power modules 70 of the present invention. All of the components shown in the figure are contained in the module 70, with the exception of the input section 59. The power units 69 substantially contain the components of the power system 1 shown in FIG. 1. The switching control unit 72 is modified by adding voltage setting resistors 74 and 74a, and a voltage follower 61. The value of the voltage setting resistors 74 and 74a, and the turn ratio of secondary wind element 15 on transformer 13 are chosen to accommodate and yield a desired regulated output voltage level from device 17.

A precision voltage reference 60 is introduced to the switching control unit 72 by a system controller 90 (see infra). It is a very accurate voltage derived from a zener diode circuit in the system controller 90 with which to compare the output voltages in the feedback loop, in order to control the pulse width modulator 35. Element 61, a voltage follower, is essentially an amplifier with a plus one gain for eliminating noise associated with the precision voltage reference.

Element 63 is an amplifier with a gain of negative one for changing the polarity of the voltage reference. It is activated when the voltage reference must be negative to correspond to a negative output voltage. Jumper options 65 switch the voltage reference 60 either to the voltage follower 61 or the minus one amplifier 63 during operation, according to the polarity of the output voltage.

The output voltage is controlled by the combination of the secondary wind element 15 and the value of the voltage setting resistor 74. Thus the present invention, with the introduction of the precision voltage reference 60, eliminates the need for prior art voltage potentiometers such as element 31. The secondary wind element 15 and the voltage setting resistor 74 are mounted in close proximity on a submodule 75 (see infra). The voltage setting resistor 74a is included in the switching control unit 72. The value of resistor 74a is fixed, and the value of resistor 74 varies according to the intended output of element 17. The standard voltage divider equation is controlling. The above-mentioned precision voltage reference 61 can be mounted inside of the switching control unit 72.

Only one precision voltage reference 60 is required. The polarity setting submodule 75a sets the polarity of the reference voltage and the output voltage, while the voltage setting resistor 74 scales the feedback voltage from unit 17 to a value near the reference voltage, readying the output voltage for comparison with the reference voltage by the error amplifier 43.

Figure 3:
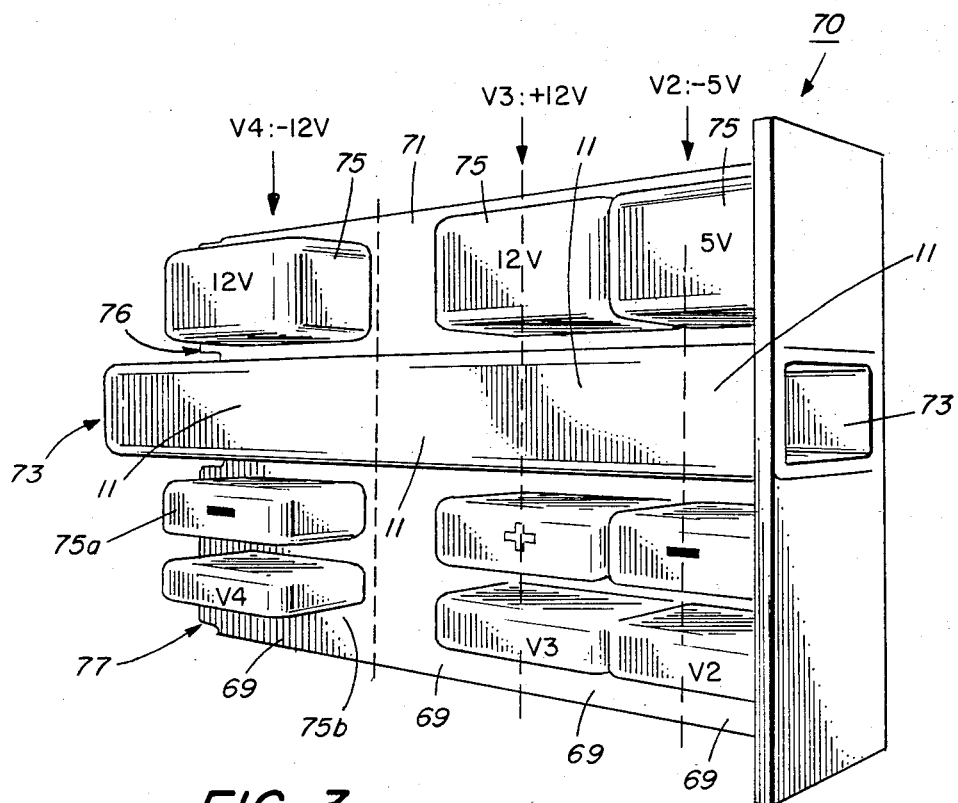
FIG. 3 is an isometric view of the power module.

FIG. 3 shows the power module 70, which contains the elements in FIG. 2. The elements of the power module 70 are mounted upon and supported by a module board 71. The power transformer 13, the voltage resistor 74 and the rectifier/filter 17 are contained in a removable submodule 75 connected to the module board 71. These elements are connected via a bus tie-in submodule 75b to power bus 76. The switching control unit 72 is mounted on module board 71, preferably adjacent to the submodule 75.

Figure 9:
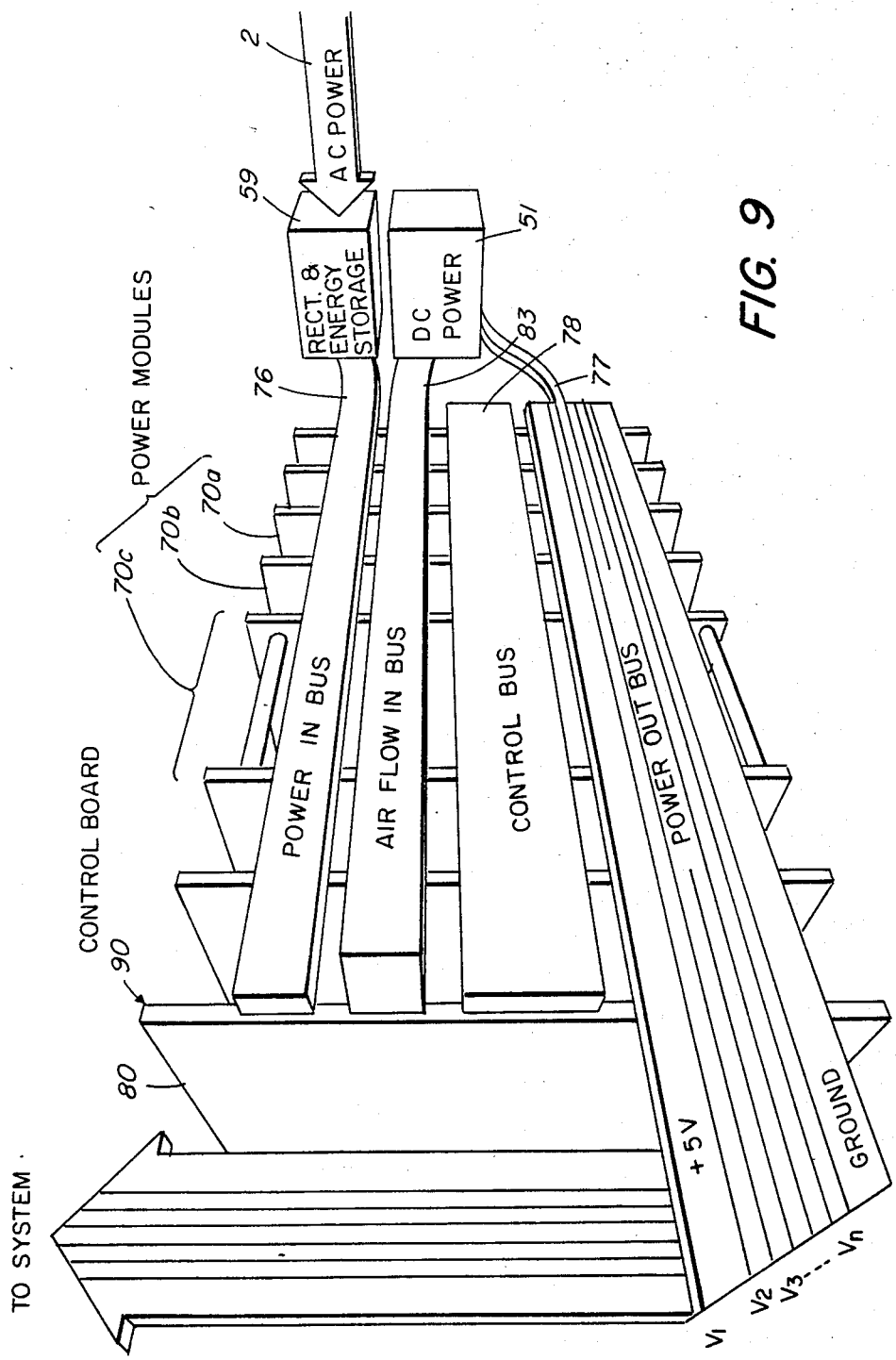
FIG. 9 is a view of the switching power system, with emphasis on its various buses.

The bus tie-in submodule 75b couples the output of the submodule 75 to a fixed power out bus line 77 shown in FIG. 9. The output can be made to appear on a desired power out bus line $v_1$, $v_2$ to $v_n$ by choosing a corresponding bus tie-in submodule 75b. Thus the output voltage of the voltage setting submodule can easily be changed from one output bus line, e.g., line $v_2$ in FIG. 9 to another, e.g., line $v_3$ in FIG. 9, by replacing the present bus tie-in submodule 75b associated with line $v_2$ with another bus tie-in submodule 75b associated with line $v_3$, thereby adding greater flexibility to the power system 1.

The polarity setting submodules serve the dual purpose of setting the polarity of the reference voltage 60, one input to the error amplifier 43, and the polarity of the feedback voltage received from the output of the voltage setting submodule 75. In operation the polarity setting submodule 75a selects either a plus reference voltage or a minus reference voltage by activating the minus-one amplifier when a negative reference voltage is desired, and deactivating the minus-one amplifier 63 when a positive reference voltage is desired. The jumper options 65 are set so that the inputs to the error amplifier 43 are automatically adjusted. The polarity of the output from the rectifier/filter 17 is determined by grounding one of its two output lines 17a or 17b. The polarity of the output voltage and the reference voltage must be the same.

A heat-sink channel 73 is located on the module assembly 70 for the cooling the module components—mainly the pass transistor 11—during operation. The pass transistor 11 is located inside of the heat-sink channel 73, and thereby receives the largest amount of cooling air during operation. Additionally, the heat-sink channel 73 contains some air bleeding holes to satisfy the less demanding cooling requirements of the other module components (e.g., elements 15, and 74).

In the preferred embodiment, each power module 70 has the ability to output multiple voltage levels. Thus, there is a parallel arrangement of switching control units 72 carried by (i.e., fabricated upon) the module board 71. Each switching control unit 72 operates exclusively with one voltage setting submodule 75, and each has a pass transistor 11 associated therewith, located inside of the heat-sink channel 73. Each output voltage (magnitude) requires the following in addition to its separate switching control unit 72: a voltage setting submodule 75, a pass transistor 11, a polarity setting submodule 75a and a bus tie-in submodule 75b. Referring to FIG. 3, the aforementioned elements comprise several switching power supply units 69 on a power module 70, each power supply unit capable of outputting one output voltage, and each independently regulated.

Figure 4:
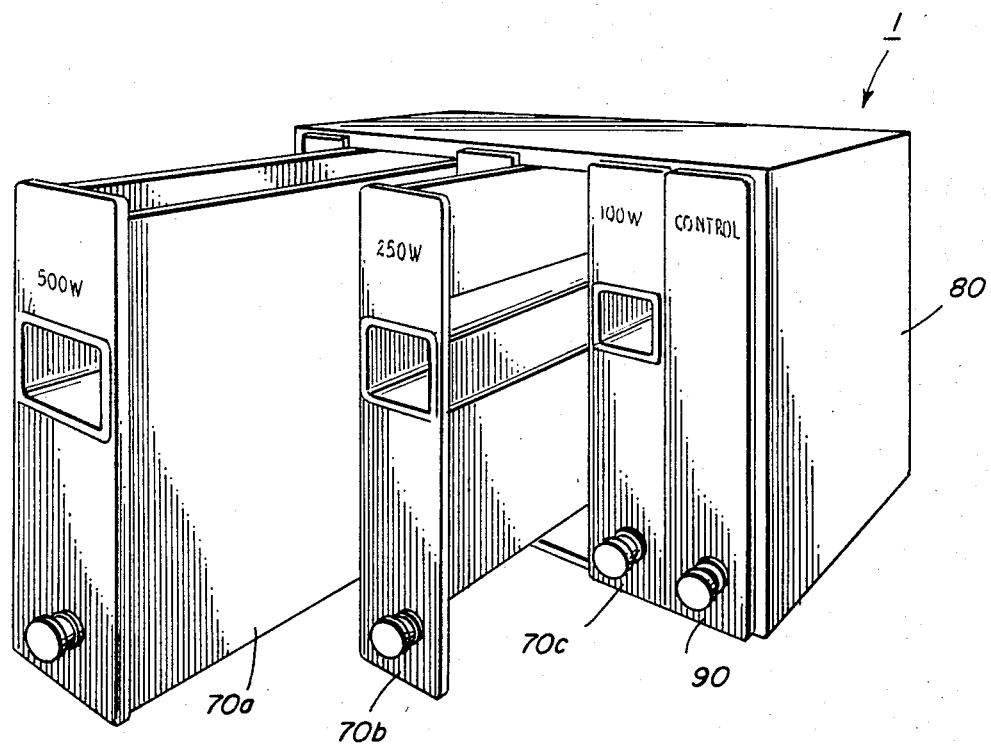
FIG. 4 is an isometric view of a group of power modules in a module cage.

FIG. 4 shows the power modules 70a, 70b and 70c slidably mounted in a module cage 80. The power modules 70a, 70b and 70c each represent different power output characteristics which are necessitated by the load conditions. The system controller 90 is shown slidably mounted in the module cage 80. In the preferred embodiment the module cage contains all of the modules needed to supply power to the system. The module guides 81 (shown in FIG. 5) receive the edges of the module boards 71, and allow the modules 70a, 70b, 70c and 90 sliding freedom so that each power module is both easily insertable and removable.

FIG. 6 shows the top view of a battery backed-up switching power system capable of use in a digital computer system. Its back-up battery 85 allows for smooth operation during temporary line power failures. The input section 59 is connected by the power bus 76 (also see FIG. 9) to the modules 70a, 70b, 70c and 90 mounted in the module cage 80. The power module cage 80 is bordered by a manifold or air duct 83, which supplies the needed airflow through outlets to the module heat sink channels 73.

Upon line power failure a DC battery 85 quickly supplies DC voltage to the power supply. It is normally necessary to raise the voltage level of the battery coupled to the input section 59. Therefore a DC to DC converter 87 converts the battery voltage from about 48 volts to approximately 300 volts DC in the preferred embodiment. This is the voltage stored by the capacitor 9 in the input section 59.

Figure 7:
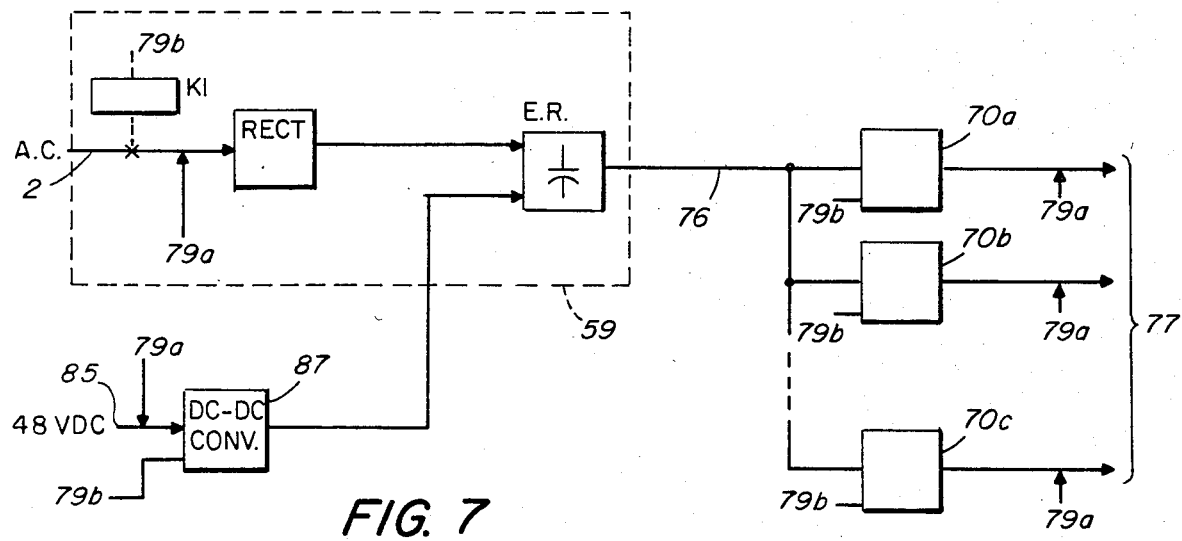
FIG. 7 is a schematic diagram of a battery backed-up switching power system using power modules.

FIG. 7 shows a controlled battery backed-up power supply. Line power 2 is supplied to the input section 59, which in turn drives the power modules 70a, 70b and 70c attached to the power bus 76. A separate power module 70 is used for each of the required operating load voltage levels. The DC battery 85 and the DC to DC converter 87 are connected to the energy reservoir 9 of the input section 59 in case of line power failure.

Figure 8:
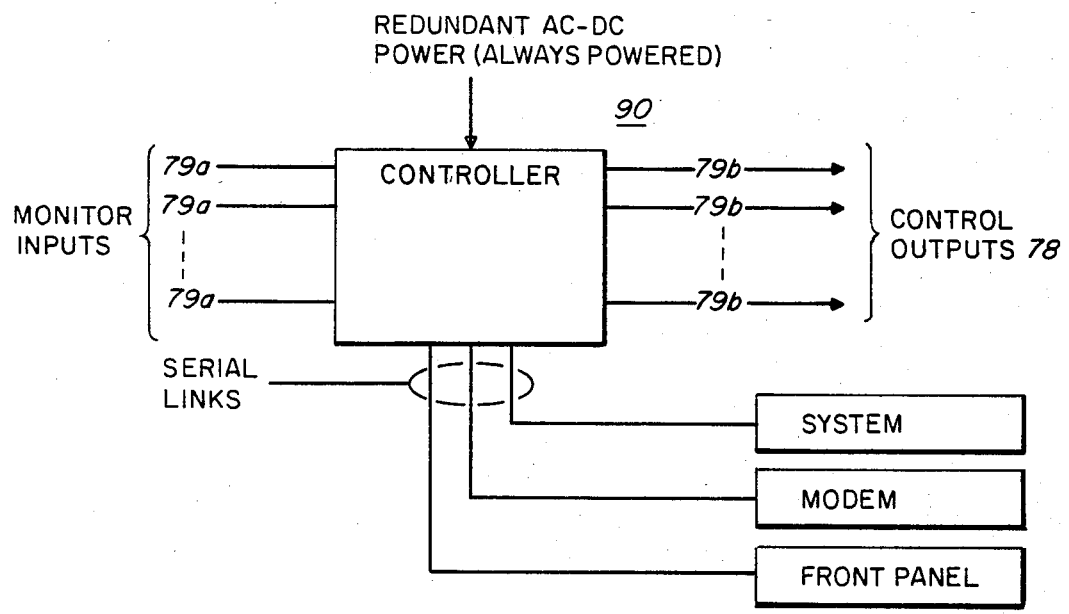
FIG. 8 is a representation of a switching power system controller.

Turning now to FIG. 8, a control device 90, powered by the linear transformer 48, is used to monitor the inputs to and the outputs from the components of the power supply 1. The system controller 90 is mounted on a separate module, and is placed inside of the module cage 80, next to the power modules 70. Using information gained from the monitoring points 79a the controller 90 senses voltage variations in the devices and switches from the line input voltage to the DC battery once detecting power failure. The controller 90 also switches the input voltage from the DC battery back to the AC line power once the power is restored, automatically terminating the operation of the DC battery.

The controller 90 sends control signals 79b via a control bus 78 to the various components of the modules 70 during operation. It can control the operation and non-operation of each subassembly of the power modules (i.e., it can determine which voltages shall be operable), and can monitor all of the power output bus lines 77, as well as provide the necessary adjustments during power failure.

FIG. 9 graphically describes the relationship between the module cage 80, power modules (70a, 70b, and 70c), buses (76, 77, 78, 83), controller 90, input section 59, and the fan 51. It is an accurate depiction of the the power system 1 in operation. AC line power is introduced to the input section 59, where it is rectified and stored. The DC power from the input section 59 is transferred by the power in bus 76 to the power modules 70a, 70b, and 70c in module cage 80. Each of the power modules is capable of outputting different voltage levels at a given load power level. For example, the power modules shown in FIG. 4 are rated at 500, 250 and 100 watts, respectively.

At a given power output it is possible to output more than one voltage level to drive the load. For instance more than one submodule containing elements 15 and 74 can be mounted on the same module. For instance, at a 100 watts output power, the voltage outputs needed at that power might be 9 volts and 12 volts. Because most computers need 5 volt power sources for much of their circuitry, a large load power is generally required. Therefore, at least one of the higher rated power modules might be devoted entirely to 5 volts. The lower rated power modules might conceivably deliver more than one output voltage.

To accommodate multiple output voltages, each module 70 contains multiple pass transistor and switching control unit combinations, the number of such combinations being equal to the maximum number of voltage levels the module can output. In other words, each group comprising a voltage setting submodule 75 and its accompanying switching devices (i.e., elements 72, 75a and 75b) works independently of other groups comprising the same. In the preferred embodiment the switching control units are located on the module boards 71, while the pass transistors are located in the heat sink channel.

Various modifications and variations of the foregoing described invention are obvious to those skilled in the art. Such modifications and variations are intended to be within the scope of the present invention. The embodiment described is representative of a multitude of variations without changing the essence of the system operation. For example, redundant power modules 70 can be used in the power supply 1 so that the failure of one module does not disable the entire power supply. The system controller 90 would cause the remaining operable power modules (at the same power rating as the failed module) to share the load.

Also, it is possible to locate the switching control units 72 inside of the polarity setting submodules 75a.

I claim:

1. A modular switching power system for supplying power to a digital computer comprising:
   input means for receiving and rectifying input alternating current (AC) power including a storage capacitor; and
   at least one power module including a switching device coupled to the storage capacitor, feedback regulation means coupled to the switching device for control thereof, both being fixedly mounted on the power module, and a transformer and regulator means coupled to the switching means to produce a desired direct current (DC) output voltage, and voltage setting means for scaling the output voltage to a reference voltage used by the feedback means to regulate the particular voltage output, said transformer, regulator means and voltage setting means contained in a submodule removably mounted on the module,
   whereby a regulated DC voltage associated with the module is changed by replacing one submodule with another having a different DC voltage output.

2. The modular switching power system in claim 1 further comprising:
   a module cage for receiving said power modules; and
   said power module is removably mounted in said cage.

3. The modular switching power system in claim 1 further comprising:
   a power bus for delivering power from said input means to each said power module, wherein each bus line of said power bus may carry a desired voltage level.

4. The modular switching power system in claim 3 wherein said power module further comprises:
   at least one removable voltage tie means for selectively connecting the voltage output from said voltage setting means to a specified line of said power bus,
   whereby the line of said power bus in which said voltage output appears is readily changed by replacing one voltage tie means with another having a different power bus line associated therewith.

5. The modular switching power system in claim 1 wherein said power module further comprises:
   a heat-sink channel for receiving cooling air to absorb heat dissipated by the components of said power module.

6. The modular switching power system in claim 1 wherein said power module further comprises:
   removable polarity setting means for identically setting the polarity of the output voltage of the input means and the polarity of said reference voltage,
   whereby the polarity of the regulated voltage associated with the module is readily changed by replacing one polarity setting means with another having a different polarity associated therewith.

7. The modular switching power system in claim 2 further comprising:
   a control module removably mounted in the cage including means for monitoring output points of said input means and said power module, and means for controlling input points of said input means and said power module.

8. The modular switching power system in claim 1 wherein said power module further comprises a plurality of groups with each said group including one each of the following:
   said switching device;
   said feedback regulation means;
   said transformer, regulator means; and
   said voltage setting means,
   whereby each said group operates independently of other said groups.

9. The modular switching power system in claim 4 wherein said power module further comprises:
   removable polarity setting means for identically setting the polarity of the output voltage of the input means and the polarity of said reference voltage,
   whereby the polarity of the regulated voltage associated with the module is readily changed by replacing one polarity setting means with another having a different polarity associated therewith.

10. The modular switching power system in claim 9 further comprising:
    a module cage for receiving said power modules;
    said power module is removably mounted in said cage; and
    a control module removably mounted in the cage including means for monitoring output points of said input means and said power module, and means for controlling input points of said input means and said power module.

* * * * *